(12) United States Patent
Hsu

(10) Patent No.: US 7,649,289 B2
(45) Date of Patent: Jan. 19, 2010

(54) WATER-REPELLENT MOTOR ASSEMBLY FOR ROTISSERIE AND CASING THEREOF

(76) Inventor: Huang-Hsi Hsu, 8F., No. 14, Lane 252, Chungshan N. Rd., Sec. 6, Taipei (TW)

( * ) Notice: Subject to any disclaimer, the term of this patent is extended or adjusted under 35 U.S.C. 154(b) by 455 days.

(21) Appl. No.: 11/545,422

(22) Filed: Oct. 11, 2006

(65) Prior Publication Data

US 2008/0088192 A1    Apr. 17, 2008

(51) Int. Cl.
*H02K 5/10*    (2006.01)
(52) U.S. Cl. .............................. 310/85; 310/89; 310/58
(58) Field of Classification Search .................... 310/85, 310/86, 88, 89, 52, 55, 56, 58, 59, 60 A
See application file for complete search history.

(56) References Cited

U.S. PATENT DOCUMENTS 3,308,317 A * 3/1967 Allenbaugh ................. 310/88
4,220,880 A * 9/1980 Woodard ..................... 310/91
4,720,648 A * 1/1988 DeVries et al. .............. 310/89
6,376,944 B1 * 4/2002 Grizzle et al. ................ 310/52
6,750,573 B1 * 6/2004 Schmidt et al. .............. 310/59

* cited by examiner

*Primary Examiner*—Dang D Le
(74) *Attorney, Agent, or Firm*—Bacon & Thomas, PLLC

(57) ABSTRACT

The present invention is to provide a water-repellent motor assembly for rotisserie and casing thereof, which comprises an inner shroud, a motor provided in the inner shroud and an outer shroud mounted around the inner shroud. A plurality of parallel bent, elongated projecting plates are projected out of an outer surface of the outer shroud. A plurality of second openings are formed on the outer shroud, correspond to the projecting plate, and are partially concealed by the projecting plates for preventing fluid from entering the outer shroud. The inner shroud comprises one or more recesses on its outer surface. A plurality of raised members are formed on an outer surface of the inner shroud and correspond to the second openings. The raised members are protruded toward the second openings and each of the raised members comprises a first opening formed on its projecting portion.

3 Claims, 6 Drawing Sheets

WATER-REPELLENT MOTOR ASSEMBLY FOR ROTISSERIE AND CASING THEREOF

FIELD OF THE INVENTION

The present invention relates to electric motor for rotisserie and more particularly to a water-repellent motor assembly mounted in a rotisserie and a casing thereof.

BACKGROUND OF THE INVENTION

People are willing to spend more time on leisure activities and enjoy same as time goes on. Thus, barbeque is gaining popularity among people since it is an activity suitable for the participation of all family members, relatives and friends. However, many visually ugly, not user-friendly, and impractical barbeques are still commercially available in the market. For example, there are two types of barbeque of substantially the same reasonable price available. It is understood that one type of barbeque bought by a person must have the features of being more user-friendly and practical as compared with the other type of barbeque. It is also understood that the barbeque market is very competitive. Thus, some manufacturers of the barbeque will be eliminated out of the market if they do not produce barbeques having the features of being more user-friendly and practical as compared with the barbeques manufactured by other barbeque manufacturers.

A conventional horizontal rotisserie 60 is shown in FIG. 1. The rotisserie 60 comprises a rectangular firepot 61 having a top opening and a space 611 confined by itself. Roasting equipment (e.g., a cooking utensil, a grill, or the like) and charcoal (all are not shown) are placed in the space 611. One rectangular bracket 62 is projected upright from one end of the firepot 61 and the other bent bracket 63 is projected upright from the other end thereof. A motor assembly 64 is mounted on a vertical portion of the other bracket 63. A shaft hole 642 having an opening facing the vertical portion of the other bracket 63 is formed in the motor assembly 64. A spit 70 has one open end rotatably put on a top notch 624 of one bracket 62 and the other end inserted into the shaft hole 642 to be secured to a shaft of the motor assembly 64. Two pairs of opposite meat grip tines 651 are provided on the spit 70 together with the spit 70 for skewering a meat 80 thereon. The motor assembly 64 is electrically connected to an external power source (not shown) via a power cord 643 which feeds power from the power source to a motor (not shown) of the motor assembly 64 when the rotisserie 60 is in use. In short, the motor assembly 64 is activated to rotate the spit 70. Also, the charcoal is burned to cook the meat 80 evenly as the spit 70 rotates.

It is understood that high heat due to hot air will be generated after the motor assembly 64 activating for a predetermined period of time. Thus, internal temperature of the motor assembly 64 will rise sharply to an undesirable high one. This inevitably will shorten a useful life of the motor and other components of the motor assembly 64. One typical solution is to house the motor assembly 64 with a metal casing such that high heat of the motor assembly 64 can be dissipated effectively through the metal casing. However, a person may be burned by touching the hot casing of the motor assembly 64 or transporting same. For cooling the motor assembly 64 in order to prevent nearby person(s) from being hurt, manufacturers of the art typically form a plurality of openings on the motor assembly 64 for heat removal, circulation of cold air in the motor assembly 64, and removal of hot air. As such, the internal temperature of the motor assembly 64 is lowered, resulting in a cooling of the surface temperature thereof.

While the openings of the motor assembly 64 aid in the lowering of the surface temperature of the motor assembly 64, preventing nearby person(s) from being hurt by the motor assembly 64, and greatly prolonging a useful life of the motor and other components of the motor assembly 64, a drawback has been found. In detail, the motor assembly 64 is typically placed in a court yard for outdoor barbequing for European and American families. Thus, it is important to consider the following factors in designing the motor assembly 64. For example, how to prevent rain from falling into the motor and circuitry of the motor assembly 64. In addition, how to prevent water from infiltrating the motor assembly 64 to damage the motor and other components of the motor assembly 64 when washing the outer surface of the motor assembly 64. Moreover, how to effectively remove high heat generated by the motor and other components of the motor assembly 64 out of the motor assembly 64 in use so as to prevent hurting from occurring.

SUMMARY OF THE INVENTION

After considerable research and experimentation, a water-repellent motor assembly for rotisserie and casing thereof having the advantages of preventing water from infiltrating the motor assembly to damage the motor and the circuitry of the motor assembly, effectively removing high heat generated by the motor of the motor assembly for lowering the internal temperature of the motor assembly, and greatly prolonging a useful life of the motor and other components of the motor assembly according to the present invention has been devised so as to overcome the above drawbacks (e.g., no means for preventing water from infiltrating the motor assembly and insufficient heat removal capability) of the prior art.

It is an object of the present invention to provide a water-repellent motor assembly for rotisserie and casing thereof. The motor assembly comprises an inner shroud and an outer shroud. The outer shroud is mounted around the inner shroud to form a water-repellent motor casing. A motor is provided in the inner shroud. A plurality of parallel bent, elongated projecting plates are projected out of an outer surface of the outer shroud. A plurality of second openings are formed on the outer shroud, correspond to the projecting plate, and are partially concealed by the projecting plates. This can prevent fluid from entering the outer shroud. The inner shroud comprises one or more recesses on its outer surface. A plurality of raised members are formed on an outer surface of the inner shroud and correspond to the second openings. The raised members are protruded toward the second openings and each of the raised members comprises a first opening formed on its projecting portion. In operation hot air generated by the motor is removed out of the motor assembly by passing the first openings, the recesses, spaces and gaps between the inner shroud and the outer shroud, and the second openings. At the same time, cold air is introduced into the inner shroud through the second openings and the first openings. By configuring as above, the water-repellent motor casing not only can prevent fluid (e.g., rain) from falling thereinto but also can greatly lower the internal temperature of the motor casing of the water-repellent motor assembly for rotisserie. As an end, the possibility of damaging the motor in the motor casing and other components of the motor assembly for rotisserie by overheat is greatly reduced.

In one aspect of the present invention the projecting plates and the raised members are formed alternately. The raised member corresponds to a position between any two adjacent second openings of the outer shroud. The first openings of the raised member are substantially concealed and are substantially not in fluid communication with the second openings of the outer shroud. This can ensure that fluid will not enter the motor assembly through the outer shroud and the inner shroud for obtaining an increased water repelling capability.

In another aspect of the present invention there are further provided two transverse ribs on the outer surface of the inner shroud adjacent top and bottom recesses respectively and secured between the inner shroud and the outer shroud. The spaces between the inner shroud and the outer shroud are substantially formed as large independent spaces for effectively removing heat and introducing cold air. The ribs are fastened between the inner shroud and the outer shroud by fixedly urging both ends of the ribs against the inner shroud and the outer shroud respectively. The spaces are thus formed between the inner shroud and the outer shroud. The inner shroud is affixed to the outer shroud so as to prevent the inner shroud from vibrating within the outer shroud.

The above and other objects, features and advantages of the present invention will become apparent from the following detailed description taken with the accompanying drawings.

DETAILED DESCRIPTION OF THE PREFERRED EMBODIMENTS

Figure 1:
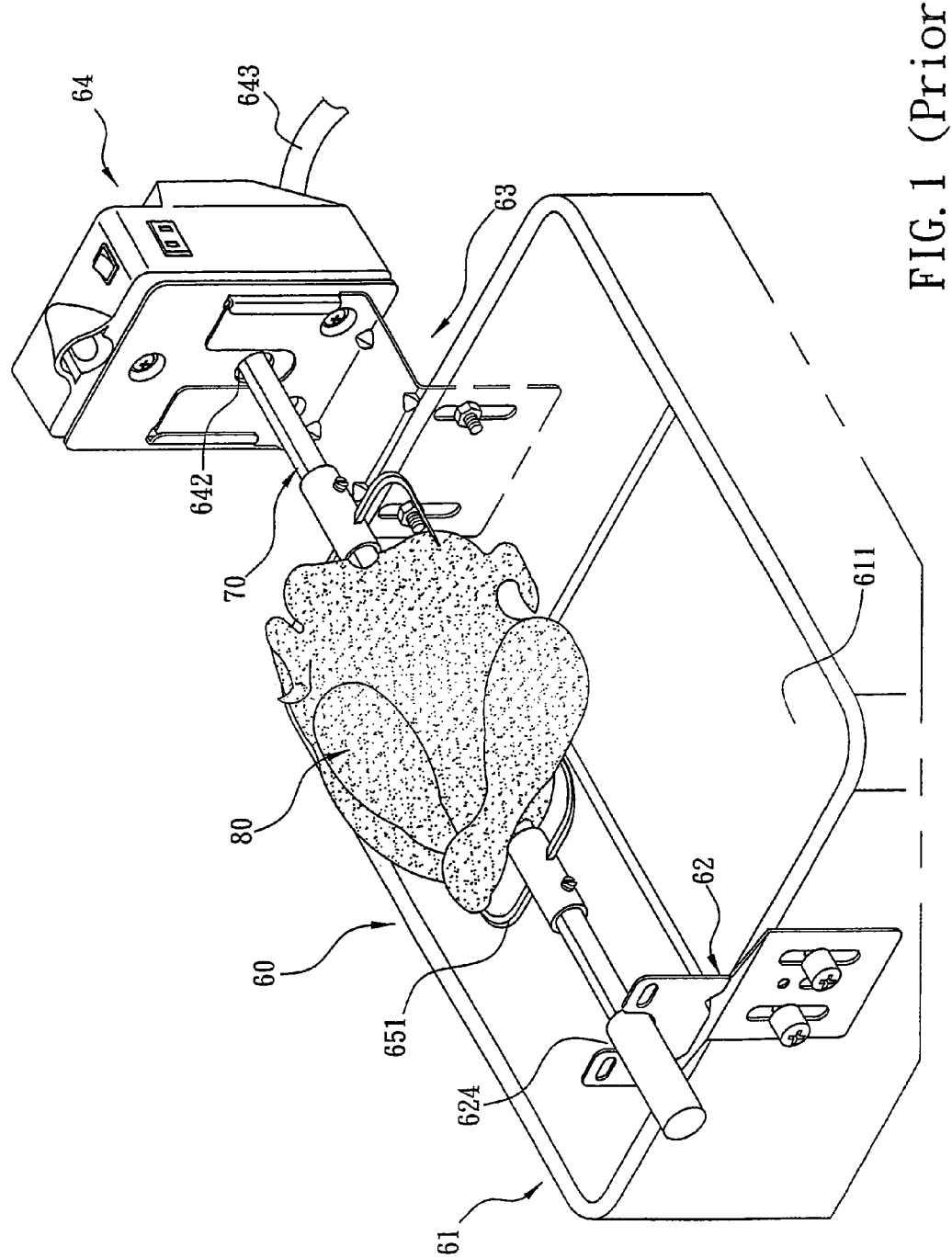
FIG. 1 is a perspective view of a conventional rotisserie with meat skewered thereon.
Figure 2:
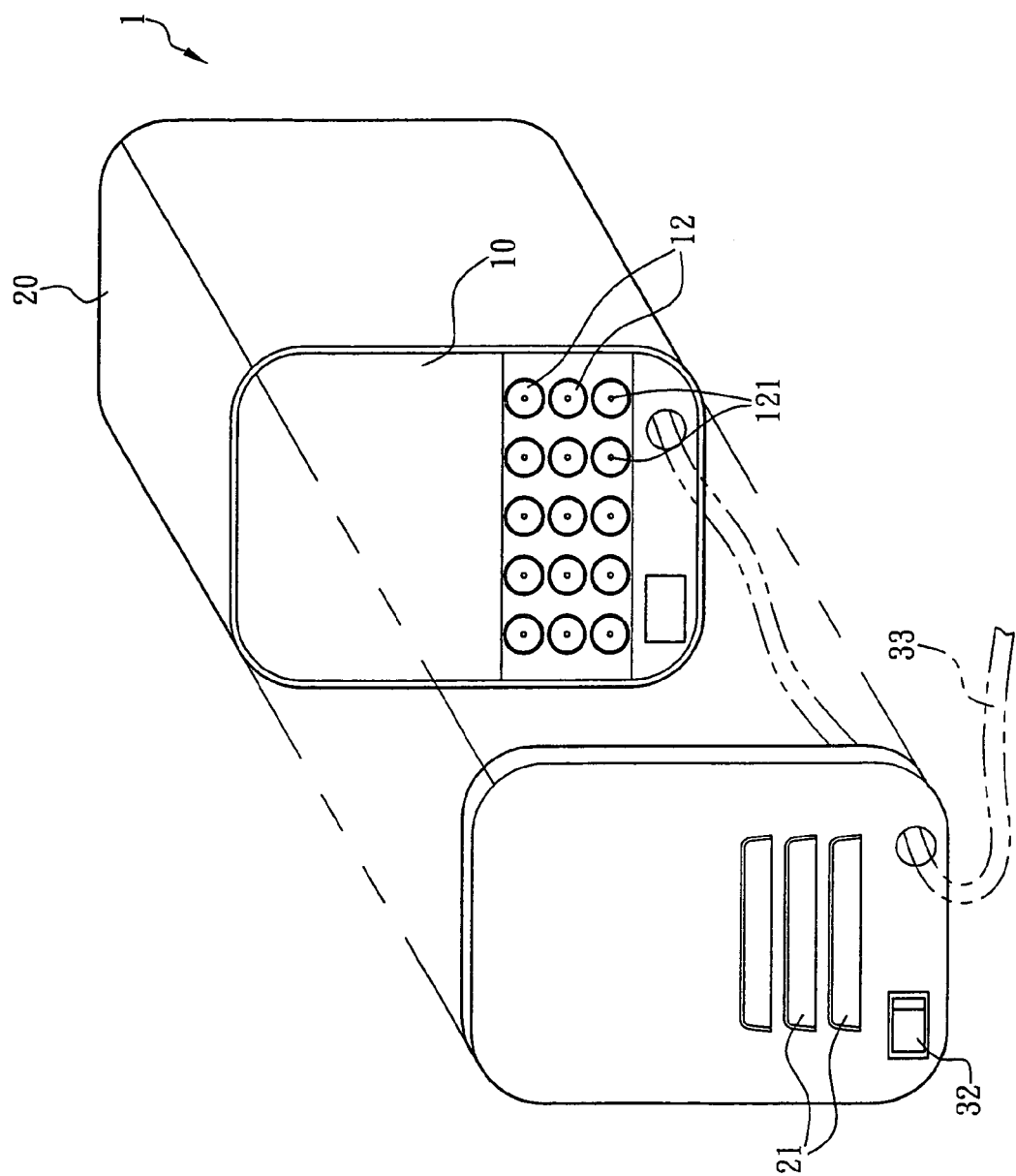
FIG. 2 is an exploded perspective view of a motor assembly for rotisserie according to the invention.
Figure 3:
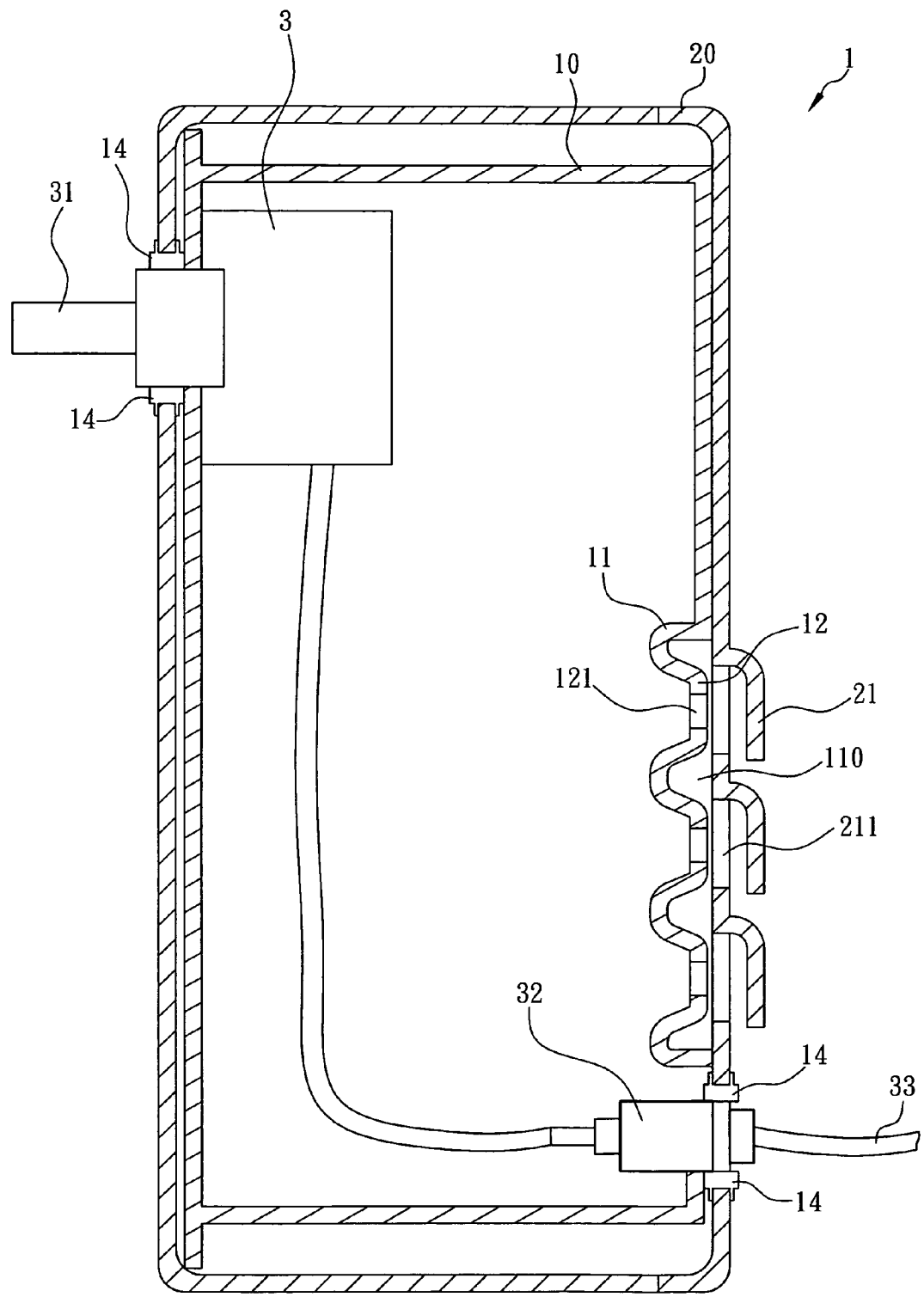
FIG. 3 is a longitudinal sectional view of a first preferred embodiment of motor assembly for rotisserie according to the invention.

Referring to FIGS. 2 and 3, a water-repellent motor assembly for rotisserie and casing thereof in accordance with a first preferred embodiment of the invention is shown. The motor assembly comprises an inner shroud 10, an outer shroud 20, and a motor 3. The outer shroud 20 is mounted around the inner shroud 10 to form a water-repellent motor casing 1. The motor 3 is provided in the inner shroud 10 and comprises a shaft 31, an on/off switch 32, and a power cord 33. One end of the switch 32 is provided externally of the outer shroud 20 and the other end thereof is provided inside the inner shroud 10 to electrically connect to the motor 3 via one section of a power cord 33 which is in turn electrically connected to an external power source (not shown). Therefore, external power can be fed to the motor 3 for activating same in use. One end of the shaft 31 is provided inside the motor 3 and the other end thereof is extended out of the motor 3 and the motor casing 1 by passing through the inner shroud 10 and the outer shroud 20. The other end of the shaft 31 is secured to a spit (not shown). In use the motor 3 is activated to rotate the shaft 31 and thus the spit. Also, for example, charcoal is burned to evenly cook a meat skewered on the spit.

Figure 4:
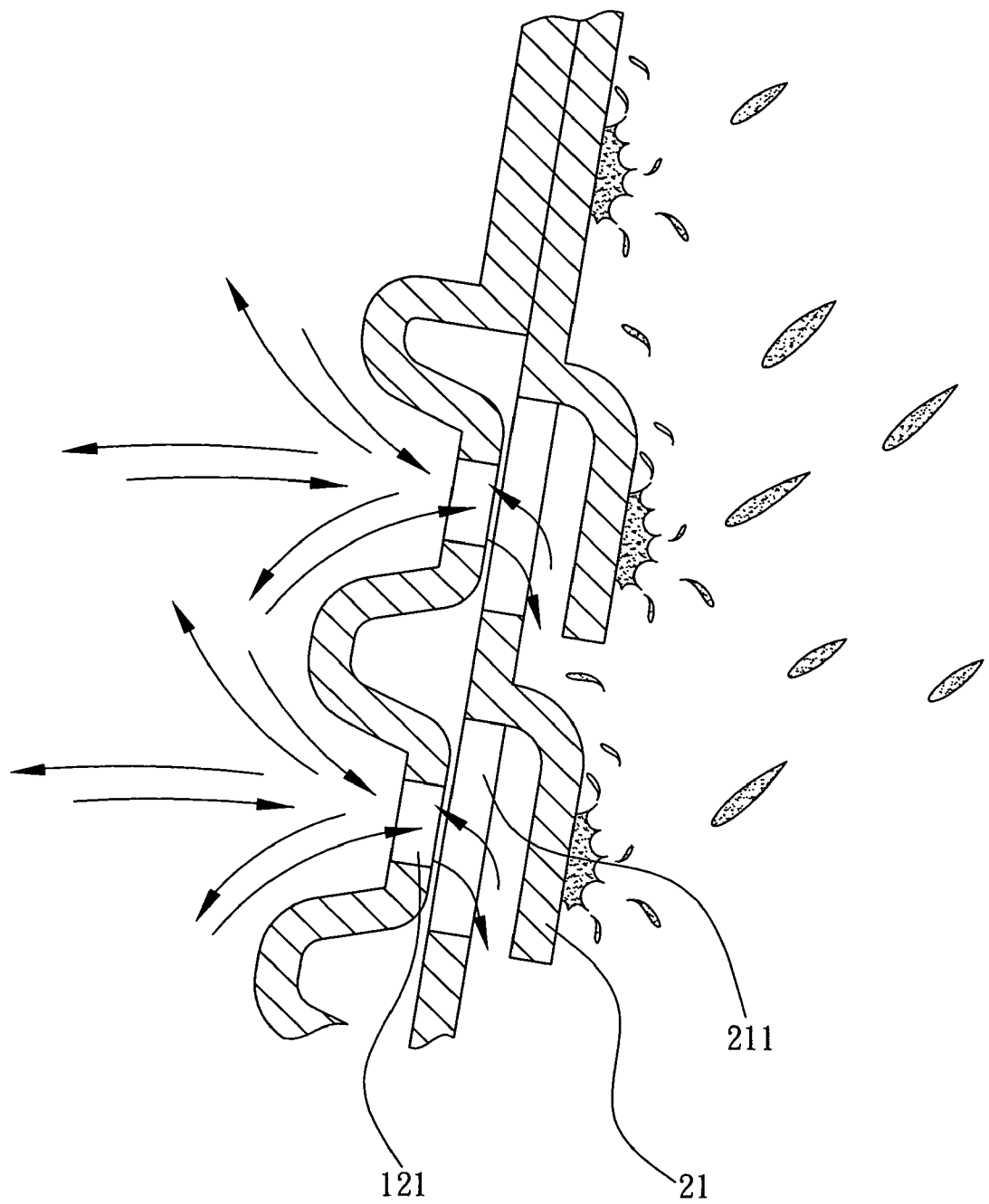
FIG. 4 is an enlarged view of a portion of the casing of the motor assembly shown in FIG. 3 for schematically illustrating water repelling and heat removal of the motor assembly.

Referring to FIG. 4 in conjunction with FIG. 3 again, in the embodiment the inner shroud 10 comprises one or more recesses 11 on its outer surface. A space 110 is defined by the recess 11 and the outer shroud 20. Further, one space 110 communicates with the adjacent space 110 through a gap between the inner shroud 10 and the outer shroud 20. A plurality of rows of raised members 12 are formed on an outer surface of the inner shroud 10 facing the outer shroud 20 and are confined between the two parallel recesses 11. A first opening 121 is formed on a projecting portion of each raised member 12. Also, a plurality of parallel bent, elongated projecting plates 21 are projected out of an outer surface of the outer shroud 20 and correspond to the raised members 12. A plurality of second openings 211 larger than the first openings 121 are formed on an outer surface of the outer shroud 20, correspond to the first openings 121, and are partially concealed by the projecting plates 21. In operation hot air generated by the motor 3 is removed out of the motor casing 1 by passing the first openings 121, the spaces 110, and the second openings 211 as indicated by rightward arrows in FIG. 4. At the same time, cold air is introduced into the inner shroud 10 through the second openings 211 and the first openings 121 as indicated by leftward arrows in FIG. 4. By configuring as above, the water-repellent motor assembly not only can prevent fluid (e.g., rain) from falling into the motor casing 1 but also can greatly lower the internal temperature of the motor casing 1. As an end, the possibility of damaging the motor 3 in the motor casing 1 and other components of the motor assembly for rotisserie by overheat is greatly reduced.

Referring to FIGS. 3 and 4 again, in the embodiment the outer surface of the inner shroud 10 above the top recess 11 is engaged with an inner surface of the outer shroud 20 of the same side. Thus, the spaces 110 between the inner shroud 10 and the outer shroud 20 are substantially formed as large independent spaces for effectively removing heat and introducing cold air. Further, the inner shroud 10 is securely affixed to the outer shroud 20 for preventing the inner shroud 10 from vibrating. This can significantly decrease the possibility of fluid falling into the outer shroud 20 and further into the inner shroud 10 through the spaces 1110.

Figure 5:
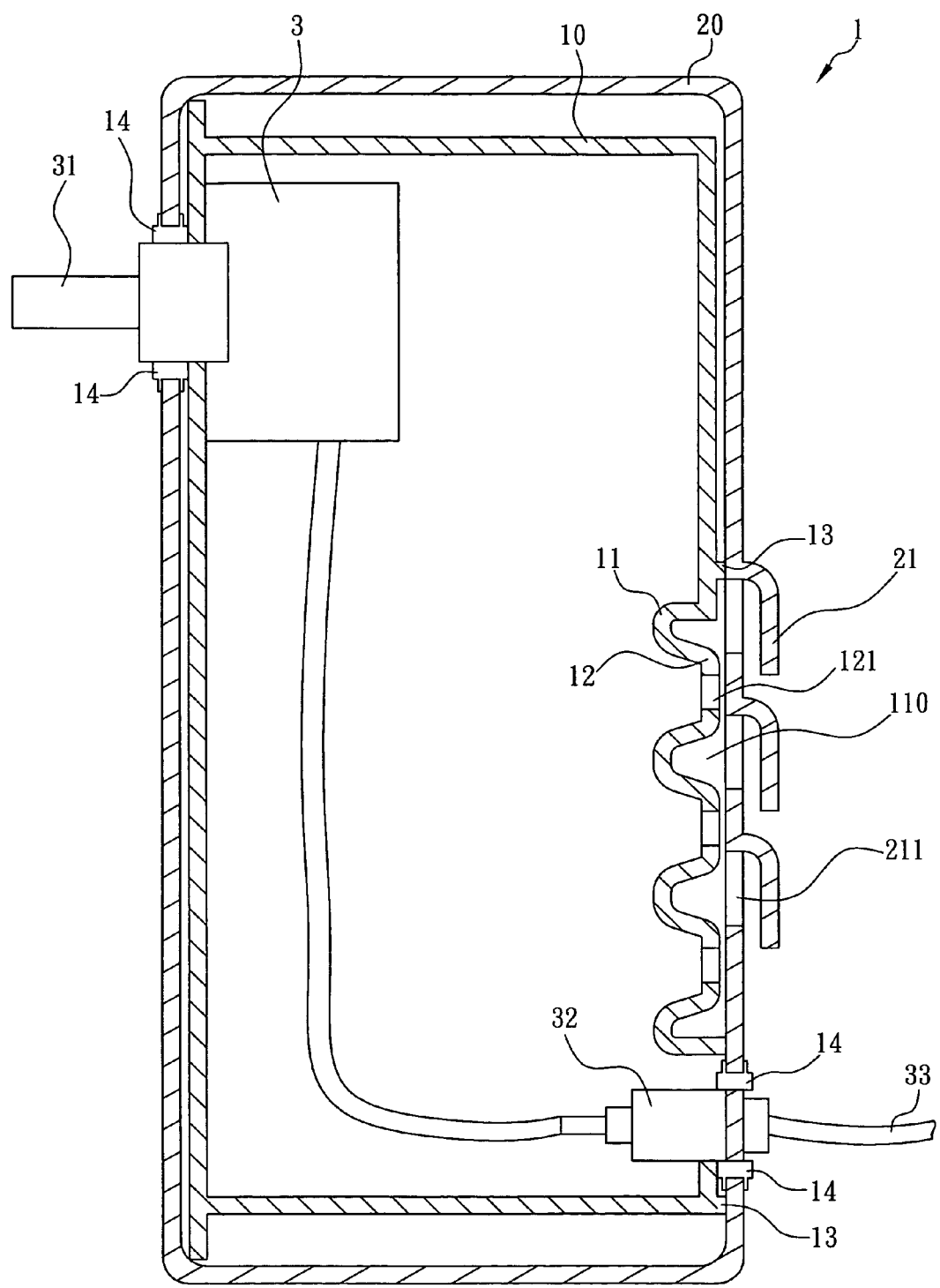
FIG. 5 is a longitudinal sectional view of a second preferred embodiment of motor assembly for rotisserie according to the invention.
Figure 6:
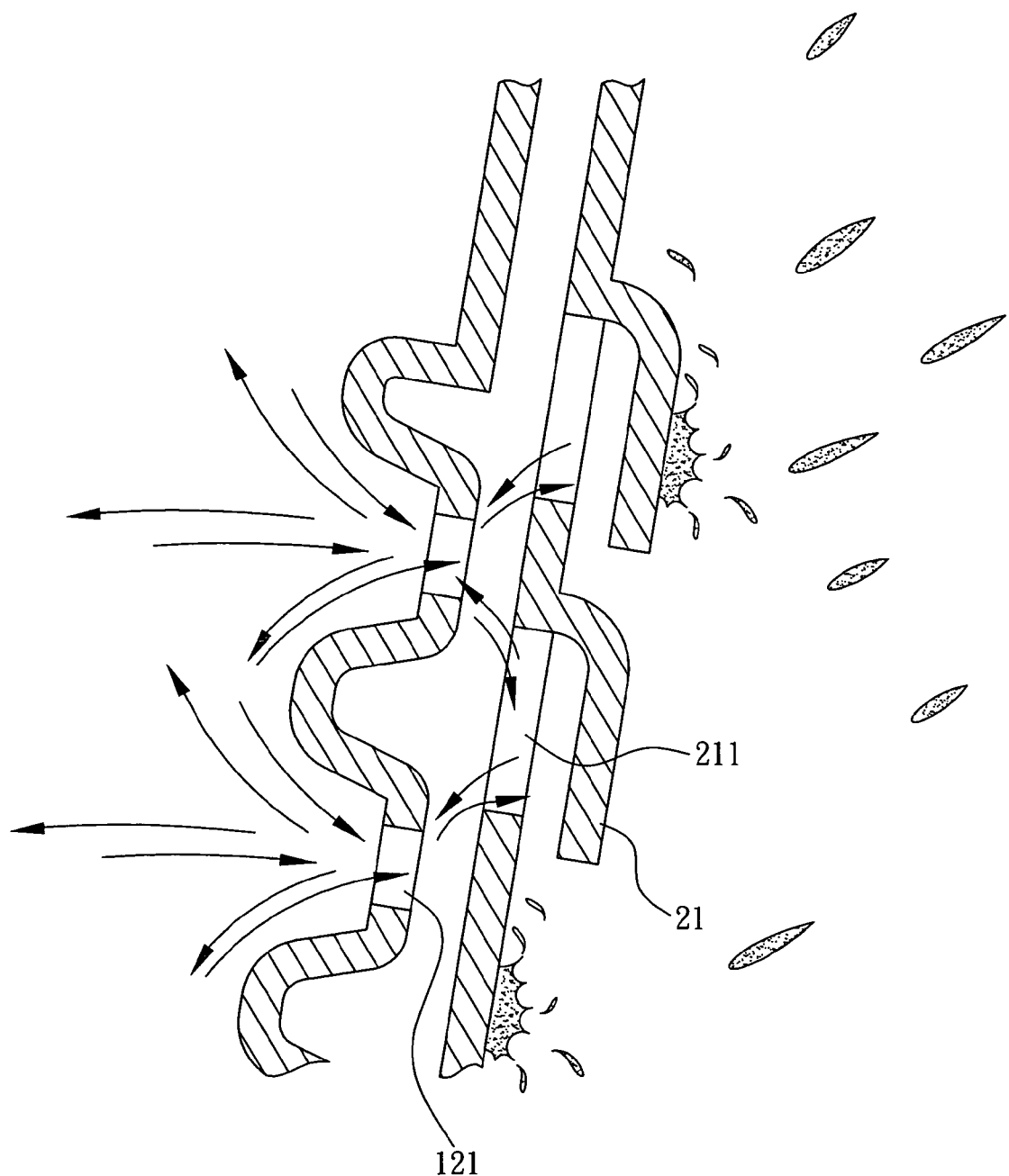
FIG. 6 is an enlarged view of a portion of the casing of the motor assembly shown in FIG. 5 for schematically illustrating water repelling and heat removal of the motor assembly.

Referring to FIGS. 5 and 6, a water-repellent motor assembly for rotisserie and casing thereof in accordance with a second preferred embodiment of the invention is shown. The second preferred embodiment aims at preventing fluid entering the spaces 110 through the second openings 211 from infiltrating the inner shroud 10 through the first openings 121 formed on the projecting portion of the raised member 12. In detail, the bent projecting plates 21 and the raised members 12 are formed alternately. Also, the first openings 121 and the second openings 211 are formed alternately. Thus, the raised member 12 corresponds to a position between any two adjacent second openings 211. Further, the first openings 121 are substantially concealed and are substantially not in fluid communication with the second openings 211. This can ensure that fluid will not enter the motor assembly through the outer shroud 20 and the inner shroud 10. Hence, the second preferred embodiment has an increased water repelling capability. Moreover, for increasing heat removal capability of the motor assembly a small gap exists between the inner shroud 10 and the outer shroud 20. Two transverse ribs 13 are formed on the outer surface of the inner shroud 10 adjacent top and bottom recesses 11 respectively. The inner shroud 10 and the outer shroud 20 are spaced each other by the ribs 13 by engaging the ribs 13 with the inner surface of the outer shroud 20. The spaces 110 between the inner shroud 10 and the outer shroud 20 are substantially formed as large independent spaces for effectively removing heat and introducing cold air. The ribs 13 are secured between the inner shroud 10 and the outer shroud 20 by fixedly urging both ends of the ribs 13 against the inner shroud 10 and the outer shroud 20 respectively. The spaces 110 are thus formed between the inner shroud 10 and the outer shroud 20. Further, the inner shroud 10 is affixed to the outer shroud 20 so as to prevent the inner shroud 10 from vibrating within the outer shroud 20.

Referring to FIGS. 3 and 6 again, a first waterproof sealing member 14 is formed externally of the shaft 31. Another second waterproof sealing member 14 is formed externally of both the switch 32 and the power cord 33 respectively. The sealing members 14 are sealingly engaged with the shaft 31, the switch 32 and the power cord 33 respectively so as to prevent rain or cleaning water from falling into the motor assembly through the outer shroud 20 and the inner shroud 10. Otherwise, the motor 3 and electrical components thereof may be short-circuited by conducting water.

While the invention herein disclosed has been described by means of specific embodiments, numerous modifications and variations could be made thereto by those skilled in the art without departing from the scope and spirit of the invention set forth in the claims.

What is claimed is:

1. A casing of a water-repellent motor assembly mountable in a rotisserie, comprising:
    an outer shroud, including a plurality of first openings formed on the outer shroud, and a plurality of elongated projecting plates each protruded from the outer surface of the outer shroud at a position above a corresponding first opening and bent downwardly for concealing the corresponding first opening; and
    an inner shroud with the motor assembly mounted therein being mounted in the outer shroud and including at least one recess on the outer surface of the inner shroud for defining a space between the recess and the outer shroud, a plurality of raised members formed on the recess facing the outer shroud and projected from the recess out to a space corresponding to the first opening, and a plurality of second openings each formed on a projecting portion of the raised member;
    wherein hot air generated by the motor assembly in the inner shroud is able to pass through the second openings and the first openings and flow to the outside of the outer shroud, and cold air outside the outer shroud is also able to be introduced into the inner shroud by passing through the first openings and the second openings, and
    wherein each of the raised members projected from the recess corresponds to a position between any two adjacent projecting plates of the outer shroud.

2. The casing of claim 1, wherein the outer surface of the inner shroud above a top one of the recesses is engaged with an inner surface of the outer shroud of the same side for defining the space between the recess and the outer shroud substantially as an independent space.

3. The casing of claim 1, further comprising two transverse ribs formed on the outer surface of the inner shroud above a top one of the recesses and below a bottom one of the recesses respectively, and secured between the inner shroud and the outer shroud for defining the space between the recess and the outer shroud substantially as an independent space.

\* \* \* \* \*

UNITED STATES PATENT AND TRADEMARK OFFICE
CERTIFICATE OF CORRECTION

PATENT NO.       : 7,649,289 B2                                        Page 1 of 1
APPLICATION NO. : 11/545422
DATED            : January 19, 2010
INVENTOR(S)      : Huang-Hsi Hsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Twenty-eighth Day of December, 2010

David J. Kappos
*Director of the United States Patent and Trademark Office*